United States Patent
Sekine et al.

(10) Patent No.: US 10,705,304 B2
(45) Date of Patent: Jul. 7, 2020

(54) METHOD FOR MANUFACTURING INTERMITTENTLY-FIXED OPTICAL FIBER RIBBON

(71) Applicant: FUJIKURA LTD., Tokyo (JP)

(72) Inventors: Shizuka Sekine, Sakura (JP); Mizuki Isaji, Sakura (JP); Kouji Tomikawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/462,728

(22) PCT Filed: Dec. 22, 2017

(86) PCT No.: PCT/JP2017/046146
§ 371 (c)(1),
(2) Date: May 21, 2019

(87) PCT Pub. No.: WO2018/123871
PCT Pub. Date: Jul. 5, 2018

(65) Prior Publication Data
US 2019/0317289 A1    Oct. 17, 2019

(30) Foreign Application Priority Data
Dec. 28, 2016 (JP) ................................. 2016-254763

(51) Int. Cl.
*G02B 6/44* (2006.01)

(52) U.S. Cl.
CPC ........... *G02B 6/4403* (2013.01); *G02B 6/448* (2013.01); *G02B 6/4471* (2013.01)

(58) Field of Classification Search
CPC .... G02B 6/4403; G02B 6/4471; G02B 6/448; G02B 6/44
See application file for complete search history.

(56) References Cited

U.S. PATENT DOCUMENTS

| 6,584,257 B1 | 6/2003 | Hurley et al. |
| 9,086,555 B2 * | 7/2015 | Namazue ................. G02B 6/44 |

(Continued)

FOREIGN PATENT DOCUMENTS

| EP | 2717082 A1 | 4/2014 |
| JP | 2005062427 A | 3/2005 |

(Continued)

OTHER PUBLICATIONS

Office Action issued in corresponding Japanese Application No. 2016-254763, dated Jan. 9, 2018 (3 pages).
(Continued)

*Primary Examiner* — Andrew Jordan
(74) *Attorney, Agent, or Firm* — Osha Liang LLP

(57) ABSTRACT

A method for manufacturing an intermittently-fixed optical fiber ribbon includes: collectively coating a plurality of optical fibers with a coating material by applying an uncured coating material that intrudes between the plurality of optical fibers and curing the intruded uncured coating material; and cutting the coating material positioned between the plurality of optical fibers at a predetermined interval in a longitudinal direction of the optical fibers with a plurality of rotary blades disposed side by side in a width direction orthogonal to the longitudinal direction, while delivering the collectively-coated optical fibers at a velocity V1 in the longitudinal direction. The velocity V1 is greater than a peripheral velocity V2 of the plurality of rotary blades.

6 Claims, 3 Drawing Sheets

(56) References Cited

U.S. PATENT DOCUMENTS

| | | | |
|---|---|---|---|
| 9,340,039 B2* | 5/2016 | Yagi | G02B 6/4482 |
| 9,541,722 B2* | 1/2017 | Sajima | G02B 6/4495 |
| 9,739,965 B2* | 8/2017 | Isaji | G02B 6/4403 |
| 9,995,896 B2* | 6/2018 | Namazue | G02B 6/4403 |
| 10,345,516 B2* | 7/2019 | Sajima | G02B 6/4494 |
| 2003/0118301 A1 | 6/2003 | Hurley et al. | |
| 2014/0112631 A1* | 4/2014 | Namazue | G02B 6/44 |
| | | | 385/114 |
| 2015/0049997 A1* | 2/2015 | Isaji | G02B 6/4403 |
| | | | 385/114 |
| 2015/0352861 A1* | 12/2015 | Yagi | G02B 6/4482 |
| | | | 347/85 |
| 2016/0070079 A1* | 3/2016 | Sajima | G02B 6/4495 |
| | | | 385/114 |
| 2016/0161692 A1* | 6/2016 | Namazue | G02B 6/4403 |
| | | | 385/114 |
| 2017/0115451 A1* | 4/2017 | Sajima | G02B 6/04 |
| 2017/0115461 A1* | 4/2017 | Namazue | G02B 6/4403 |
| 2017/0184803 A1* | 6/2017 | Namazue | G02B 6/4403 |
| 2018/0321454 A1* | 11/2018 | Sato | G02B 6/441 |
| 2019/0317289 A1* | 10/2019 | Sekine | G02B 6/4471 |

FOREIGN PATENT DOCUMENTS

| | | |
|---|---|---|
| JP | 4055000 B2 | 3/2008 |
| JP | 2010033010 A | 2/2010 |
| JP | 2013257394 A | 12/2013 |
| JP | 6015152 B2 | 10/2016 |
| JP | 2016206499 A | 12/2016 |
| TW | I540354 B | 7/2016 |

OTHER PUBLICATIONS

Decision of Rejection issued in corresponding Japanese Application No. 2016-254763, dated Apr. 17, 2018 (2 pages).

Office Action issued in corresponding Taiwanese Application No. 106145507, dated Jul. 30, 2018 (4 pages).

Decision of Rejection issued in corresponding Taiwanese Application No. 106145507, dated Nov. 30, 2018 (3 pages).

Appeal Decision issued in corresponding Japanese Application No. 2016-254763, dated Mar. 12, 2019 (16 pages).

* cited by examiner

METHOD FOR MANUFACTURING INTERMITTENTLY-FIXED OPTICAL FIBER RIBBON

Priority is claimed from Japanese Patent Application No. 2016-254763, filed on Dec. 28, 2016, the content of which is incorporated herein by reference.

TECHNICAL FIELD

The present invention relates to a method for manufacturing an intermittently-fixed optical fiber ribbon.

BACKGROUND

In recent years, an intermittently-fixed-type optical fiber ribbon (hereinafter simply referred to as an intermittently-fixed optical fiber ribbon) has been proposed in which connecting portions for connecting adjacent optical fibers are intermittently disposed in the longitudinal direction of the optical fiber. The intermittently-fixed optical fiber ribbon has an advantage that optical fibers can be installed in an optical fiber cable at high density and the optical fibers can be easily and collectively fusion-spliced at the time of connection work. A method for manufacturing this type of intermittently-fixed optical fiber ribbon is disclosed in, for example, Patent Document 1 below.

In the manufacturing method of Patent Document 1, when delivering a plurality of optical fibers, an uncured UV curable resin serving as a connecting portion is intermittently applied to the optical fibers in the longitudinal direction. Then, the connecting portion is formed by applying UV light of an amount required for curing the UV curable resin until the optical fibers are converged in parallel.

PATENT DOCUMENTS

[Patent Document 1] Japanese Unexamined Patent Application, First Publication No. 2010-33010

Incidentally, in the manufacturing method of Patent Document 1, an uncured UV curable resin serving as a connecting portion is intermittently applied and cured. In this case, the uncured UV curable resin may adhere to the optical fibers beyond a predetermined range, and then it is cured, there is a possibility that the interval between the connecting portions may decrease unexpectedly. Further, since the connecting portion is formed beyond the predetermined range, it is difficult for the optical fibers accommodated in the cable to move relative to each other, for example, micro-bending occurs or side pressure acts on the optical fiber, so there is a possibility that transmission loss of light increases.

The phenomenon that the formation range of the connecting portion becomes unstable as described above is especially remarkable when the delivery velocity of the optical fibers at the time of manufacturing the intermittently-fixed optical fiber ribbon is increased. Therefore, the manufacturing efficiency is decreased.

SUMMARY

One or more embodiments of the present invention stabilize the range in which the connecting portion is formed, and improve manufacturing efficiency of the intermittently-fixed optical fiber ribbon.

A method for manufacturing an intermittently-fixed optical fiber ribbon according to one or more embodiments of the present invention includes a step of collectively coating a plurality of optical fibers with a coating material by applying an uncured coating material to intrude between the plurality of optical fibers and curing the intruded uncured coating material; and a step of cutting the coating material positioned between the plurality of optical fibers at a predetermined interval in a longitudinal direction, by using a plurality of rotary blades disposed side by side in a width direction orthogonal to the longitudinal direction, while delivering the collectively-coated optical fibers at a velocity $V1$ in the longitudinal direction, in which the velocity $V1$ is greater than a peripheral velocity $V2$ of the rotary blade.

According to one or more embodiments of the present invention, it is possible to stabilize the range in which the connecting portion is formed, and to improve manufacturing efficiency of the intermittently-fixed optical fiber ribbon.

DETAIL DESCRIPTION

Hereinafter, an intermittently-fixed optical fiber ribbon according to one or more embodiments and a manufacturing method thereof will be described with reference to FIGS. 1 to 4. In each drawing used in the following description, the scale is appropriately changed in order to make each member recognizable. Further, for the sake of simplicity of illustration, the number of optical fibers and the like may be changed in some cases.

Figure 1:
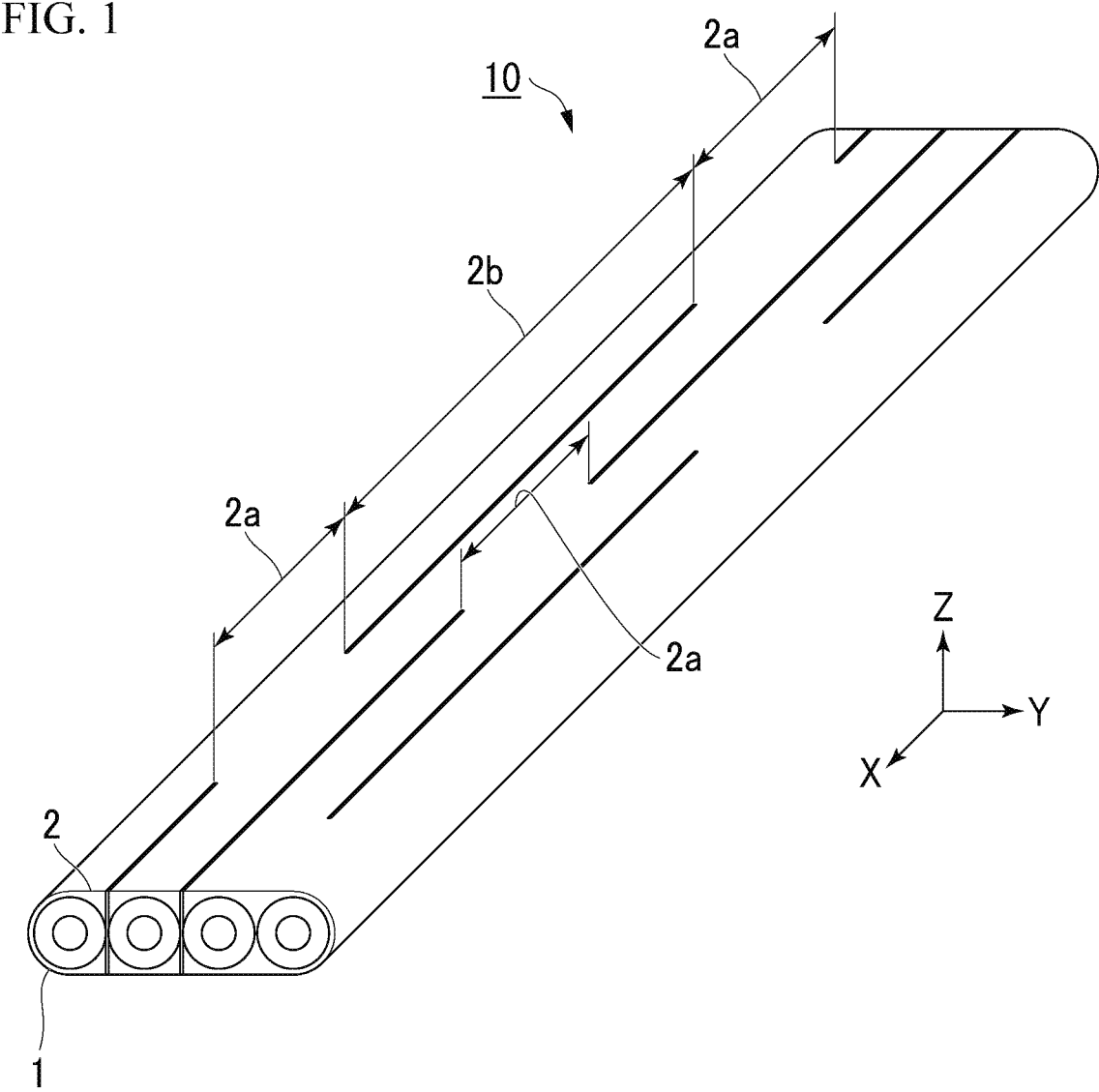
FIG. 1 is an explanatory diagram of an intermittently-fixed optical fiber ribbon in accordance with one or more embodiments.

As shown in FIG. 1, in one or more embodiments, a plurality of optical fiber element wires or optical fiber core wires (hereinafter simply referred to as optical fibers 1) are collectively coated with the coating material 2 in the intermittently-fixed optical fiber ribbon 10.

Direction Definition

Here, in one or more embodiments, the positional relationship of each configuration will be described by setting the XYZ orthogonal coordinate system. A longitudinal direction X is a direction in which the optical fiber 1 extends. The width direction Y is a direction in which a plurality of optical fibers 1 are arranged, and is orthogonal to the longitudinal direction X. The vertical direction Z is a direction orthogonal to the longitudinal direction X and the width direction Y.

The coating material 2 is made of, for example, a UV curable resin or a thermosetting resin. The coating material 2 intrudes between the adjacent optical fibers 1. A portion of the coating material 2 located between the adjacent optical fibers 1 is intermittently cut along the longitudinal direction X in which the optical fiber 1 extends. Thus, a connecting portion 2a connecting the adjacent optical fibers 1 to each other and a separating portion 2b positioned between the connecting portions 2a adjacent to each other in the longitudinal direction X are formed. In the separating section 2b, the adjacent optical fibers 1 are not connected to each other.

Another connecting portion 2a connecting one of the adjacent optical fibers 1 and the other optical fiber 1 adjacent thereto is disposed in a position shifted from the position of the connecting portion 2a connecting adjacent optical fibers 1 in the longitudinal direction X. In this manner, the connecting portions 2a are disposed in a staggered manner (zigzag shape) with respect to both directions of the longitudinal direction X and the width direction Y.

Next, a method for manufacturing the intermittently-fixed optical fiber ribbon 10 in accordance with one or more embodiments will be described.

Figure 2:
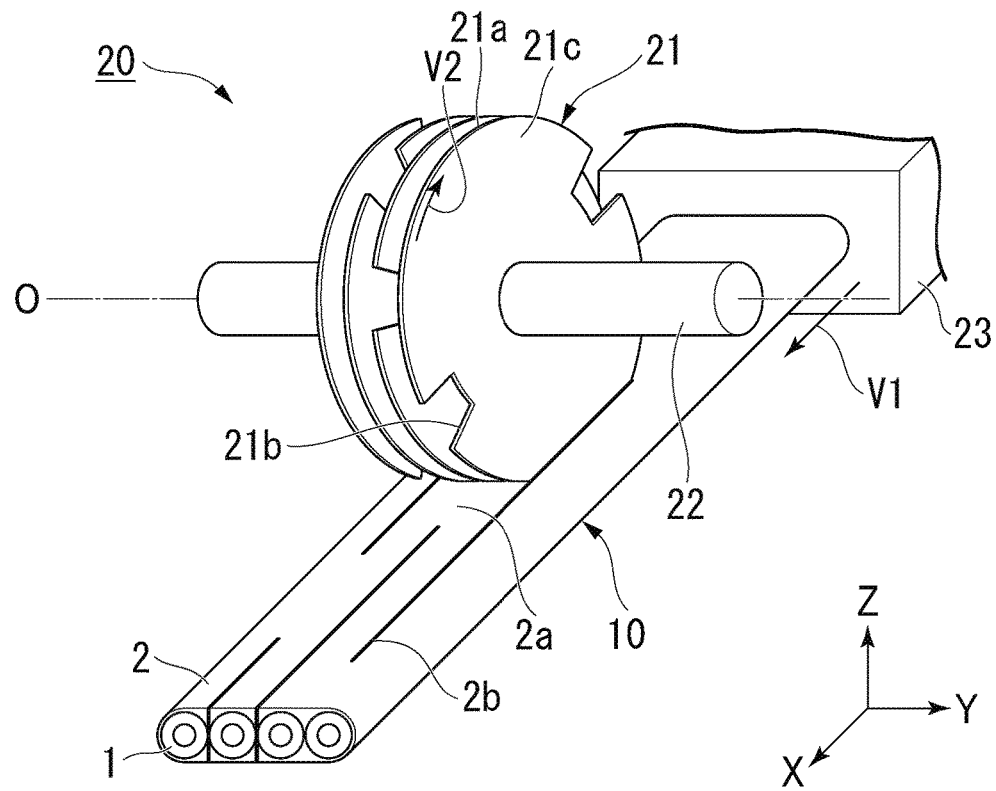
FIG. 2 is a diagram showing a method for manufacturing the intermittently-fixed optical fiber ribbon of FIG. 1 in accordance with one or more embodiments.

As shown in FIG. 2, in one or more embodiments, a manufacturing apparatus 20 of the intermittently-fixed optical fiber ribbon 10 includes a plurality of rotary blades 21 disposed side by side in the width direction Y, a rotary shaft 22, and a delivery device 23. The plurality of rotary blades 21 are attached to the rotary shaft 22, and rotate integrally with the rotary shaft 22 around the central axis O of the rotary shaft 22. The rotary blade 21 is provided with a cutout portion 21b to be described later. Further, the phases (angles) in which the adjacent rotary blades 21 are attached to the rotary shaft 22 are different from each other. Therefore, as described above, the connecting portions 2a of the intermittently-fixed optical fiber ribbon 10 are disposed in a staggered manner (zigzag manner) with respect to the longitudinal direction X and the width direction Y. The delivery device 23 delivers the plurality of optical fibers 1 which are collectively coated toward the rotary blade 21 at the delivery velocity V1.

Figure 3:
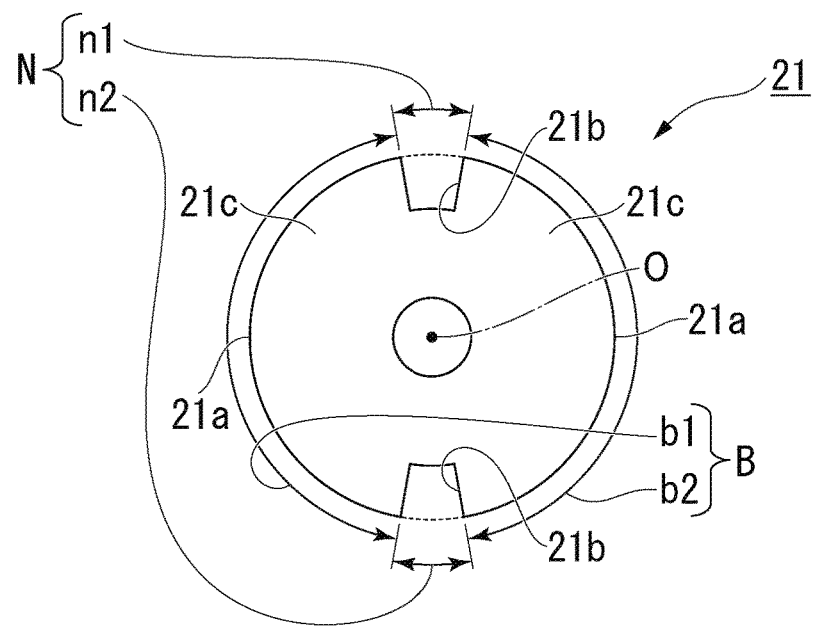
FIG. 3 is an explanatory diagram of a rotary blade of FIG. 2 in accordance with one or more embodiments.

As shown in FIG. 3, in one or more embodiments, the rotary blade 21 is formed into a disc shape with the central axis O as a center. The rotary blade 21 has a cutout portion 21b recessed radially inward from the outer peripheral edge (radially outer edge) 21a. In the rotary blade 21, the outer peripheral edge 21a and its radially inner portion are a blade body portion 21c which forms the separating portion 2b by cutting the coating material 2. In the rotary blade 21, the cutout portion 21b is a portion forming the connecting portion 2a.

In the example shown, a pair of cutout portions 21b are formed so as to interpose the central axis O therebetween in the radial direction. Thus, the rotary blade 21 is provided with two blade body portions 21c. The arc lengths of the outer peripheral edges 21a of the two blade body portions 21c are b1 and b2, respectively. Therefore, the total value of the arc lengths of the outer peripheral edges 21a of the rotary blades 21 (hereinafter referred to as the cut portion length B) is calculated by B=b1+b2.

The virtual arc lengths of the outer peripheral edges 21a in the two cutout portions 21b are n1 and n2. Therefore, the total value of the virtual arc lengths of the outer peripheral edges 21a of the cutout portions 21b of the rotary blades 21 (hereinafter referred to as the connecting portion length N) is calculated by N=n1+n2.

In the example shown, since the rotary blades 21 are point-symmetric shape about the central axis O, b1 and b2 are substantially equal to each other and n1 and n2 are substantially equal to each other. Therefore, all the ratio between b1 and n1, the ratio between b2 and n2, and the ratio between B and N are substantially equal.

The number, sizes, and the like of the cutout portions 21b provided in the rotary blade 21 can be appropriately changed. For example, one or three or more cutout portions 21b may be provided in the rotary blade 21. Alternatively, the dimensions n1, n2, b1, b2 may be appropriately changed.

In manufacturing the intermittently-fixed optical fiber ribbon 10, first, in a state where a plurality of optical fibers 1 are arranged in the width direction Y, an uncured coating material 2 is applied so as to intrude between the optical fibers 1 by a coating device (not shown) and the coating material 2 is cured. Thereby, the plurality of optical fibers 1 are collectively coated with the coating material 2.

Next, the plurality of optical fibers 1 which are collectively coated are delivered by the delivery device 23 toward the rotary blade 21 at the delivery velocity V1. At this time, the rotary blade 21 is rotated around the central axis O such that the peripheral velocity at the outer peripheral edge 21a becomes V2. In the portion where the rotary blade 21 and the coating material 2 are in contact with each other, the rotary blade 21 rotates in a direction in which the moving direction of the blade body portion 21c coincides with the delivering direction by the delivery device 23. That is, when the coating material 2 is cut, the relative velocity of the outer peripheral edge 21a of the rotary blade 21 with respect to the coating material 2 and the plurality of optical fibers 1 is the difference between the peripheral velocity V2 and the delivery velocity V1.

When the plurality of optical fibers 1 which are collectively coated are brought into contact with the plurality of rotary blades 21, the coating material 2 positioned between the optical fibers 1 is cut by the blade body portion 21c of each rotary blade 21. At this time, since the coating material 2 is not cut at the cutout portion 21b, the coating material 2 is intermittently cut at intervals in the longitudinal direction X. Thus, the connecting portion 2a and the separating portion 2b of the coating material 2 are formed.

As described above, the method for manufacturing the intermittently-fixed optical fiber ribbon 10 in accordance with one or more embodiments includes a step of collectively coating a plurality of optical fibers 1 with the coating material 2 by applying uncured coating material to intrude between the plurality of optical fibers 1 and curing the intruded uncured coating material; and a step of cutting the coating material 2 positioned between the plurality of optical fibers 1 at a predetermined interval in a longitudinal direction X, by using a plurality of rotary blades 21 disposed side by side in a width direction Y orthogonal to the longitudinal direction X, while delivering the collectively-coated optical fibers 1 at a velocity V1 in the longitudinal direction X.

Next, specific examples of the above manufacturing method will be described.

Example 1

In this example, it is considered to check the superiority of the above manufacturing method.

Specifically, as described above, after the optical fibers 1 are collectively coated, the delivery velocity V1 when the optical fibers 1 are delivered to the rotary blade 21 is changed. The peripheral velocity V2 is fixed. Then, the intermittently-fixed optical fiber ribbon 10 of Example 1 is produced in which the connecting portions 2a are formed by partially cutting the coating material 2 with the rotary blades 21.

In Example 1, a colored optical fiber core having a diameter of φ250 μm is used as the optical fiber 1. The number of optical fibers 1 included in the intermittently-fixed optical fiber ribbon 10 is 12. The delivery velocity V1 of the optical fiber 1 which is collectively coated is varied in the range of 200 to 1200 (m/min).

Further, in order to compare with Example 1, as in the related art, the intermittently-fixed optical fiber ribbon 10 of Comparative Example 1 is produced in which a plurality of optical fibers 1 are intermittently coated with an uncured resin, and the connecting portion 2a is formed by curing the uncured resin.

With respect to Example 1 and Comparative Example 1, a plurality of intermittently-fixed optical fiber ribbons 10 are produced by changing the delivery velocity V1, and the results of checking the state of the connecting portion 2a are shown in the following Table 1. In Table 1, OK (good) is indicated as acceptable or good determination, and NG (defective) is indicated as rejection or failure determination. Specifically, the case where the connecting portion 2a is formed beyond the desired range is defined as NG (defective), and the case where the connecting portion 2a is formed within the desired range is defined as OK (good).

TABLE 1

| | Delivery Velocity V1 (m/min) | | | | | |
|---|---|---|---|---|---|---|
| | 200 | 400 | 600 | 800 | 1000 | 1200 |
| Comparative Example 1 | OK | OK | OK | OK | NG | NG |
| Example 1 | OK | OK | OK | OK | OK | OK |

As shown in Table 1, when the delivery velocity V1 is 1000 (m/min) or more, in Comparative Example 1, the connecting portion 2a is formed beyond the desired range. On the other hand, in the manufacturing method for Example 1, even when the delivery velocity V1 is 1000 (m/min) or more, the connecting portion 2a is formed within the desired range.

As described above, according to the manufacturing method for Example 1, as compared with the case where uncured resin is intermittently applied to the plurality of optical fibers 1 in the longitudinal direction X and the resin is cured, and the uncured resin adheres beyond a predetermined range, it is possible to prevent the formation range of the connecting portion 2a from becoming unstable. Further, in the manufacturing method for Example 1, even if the delivery velocity V1 is increased, the forming range of the connecting portion 2a can be stabilized, so it has been confirmed that the manufacturing efficiency of the intermittently-fixed optical fiber ribbon 10 can be improved.

Example 2

In the present example, the ratio between the delivery velocity V1 and the peripheral velocity V2 of the rotary blade 21 is considered.

Specifically, colored optical fiber cores of φ250 μm are used as the optical fibers 1, and after 12 optical fibers are collectively coated, the coating material 2 is partially cut by the rotary blades 21 to form the connecting portion 2a. At this time, the ratio between the delivery velocity V1 and the peripheral velocity V2 is changed. When this ratio is changed, if the same rotary blade 21 is used, the lengths of the connecting portion 2a and the separating portion 2b in the longitudinal direction X change. Therefore, in the present example, as the ratio between the delivery velocity V1 and the peripheral velocity V2 is changed, by adjusting the number of cutout portions 21b provided in the rotary blade 21, the lengths of the connecting portion 2a and the separating portion 2b are maintained constant. For example, when V1:V2=4:1, the rotary blades 21 having eight cutout portions 21b are used. With this as a reference, for example, when V1:V2=2:1, the rotary blades 21 having four cutout portions 21b are used, as the ratio of V1 to V2 increases. In one or more embodiments, all of the rotary blades 21 have a point-symmetric shape about the central axis O.

In the present example, the intermittently-fixed optical fiber ribbon 10 (hereinafter referred to as Example 2) is produced by changing V1:V2 in a range of 1:2 to 10:1. Further, in order to compare with the intermittently-fixed optical fiber ribbon 10, a flat 12-core optical fiber ribbon without the separating portion 2b (hereinafter referred to as Comparative Example 2) is produced. Then, the optical fiber ribbon of Example 2 and Comparative Example 2 are wound around a bobbin having a barrel diameter of 310 mm at a tension of 300 gf for 10 km, and the transmission loss of light at a wavelength of 1.55 μm is measured by optical time domain reflectometer (OTDR). Then, the difference between the maximum transmission loss of light of Example 2 and the maximum transmission loss of light of Comparative Example 2 (hereinafter simply referred to as difference Δα) is calculated.

In the following Table 2, it is assumed that the evaluation result is OK (good) as being good when Δα≤0.05 (dB/km), and the evaluation result is NG (defective) as being insufficient when Δα>0.05 (dB/km).

TABLE 2

| | | Velocity Ratio (V1:V2) | | | | | | | | |
|---|---|---|---|---|---|---|---|---|---|---|
| | | 1:2 | 1:1 | 3:2 | 2:1 | 3:1 | 4:1 | 6:1 | 8:1 | 10:1 |
| Transmission Loss | Δα (dB/km) | 0.08 | 0.07 | 0.07 | 0.03 | 0.03 | 0.02 | 0.04 | 0.02 | 0.03 |
| | Determination | NG | NG | NG | OK | OK | OK | OK | OK | OK |

From Table 2, it can be determined that when the peripheral velocity V2 of the rotary blade 21 is relatively large, the transmission loss of light of the intermittently-fixed optical fiber ribbon 10 tends to increase. Specifically, the evaluation result is NG (bad) when V1:V2 is in the range of 1:2 to 3:2. This is thought to be because when the peripheral velocity V2 of the rotary blade 21 is relatively large, the coating material 2 is cut such that the rotary blade 21 presses against the coating material 2 mainly from the vertical direction Z, so burrs protruding in the vertical direction Z are likely to occur. In a case where such burrs are generated, when the intermittently-fixed optical fiber ribbon 10 is wound around a bobbin, the burrs are pushed against the optical fiber 1 and a local side pressure acts on the optical fiber 1, so it is thought that the transmission loss of light is increased.

On the other hand, when V1:V2 is in the range of 2:1 to 10:1, the evaluation result is OK (good). When the peripheral velocity V2 of the rotary blade 21 is relatively small, the coating material 2 is cut such that the rotary blade 21 presses against the coating material 2 mainly from the longitudinal direction X. Therefore, burrs protruding in the vertical direction Z are less likely to occur. In the case where such burrs are unlikely to occur, since the local side pressure caused by the burrs pressing against the optical fiber 1 hardly acts on the optical fiber 1, it is possible to suppress the transmission loss of light to the same amount as in the flat optical fiber ribbon of the Comparative Example 2, which does not have the separating portion 2b.

According to the above results, it is possible to suppress occurrence of burrs when cutting the coating material 2 by setting the delivery velocity V1 to be twice or more the peripheral velocity V2 of the rotary blade 21. Further, it is possible to suppress an increase in the transmission loss of light, the transmission loss caused by the burr when the intermittently-fixed optical fiber ribbon 10 is wound around the bobbin and a side pressure acts on the optical fiber 1 by the burr. Further, it is considered that such an effect can be obtained also when, for example, the intermittently-fixed optical fiber ribbons 10 are bundled at high density in the optical fiber cable.

Example 3

In one or more embodiments, the shape of the rotary blade 21 is considered.

Specifically, a plurality of types of rotary blades 21 in which the ratios of b1 and n1 shown in FIG. 3 are changed are prepared, and the intermittently-fixed optical fiber ribbon 10 is produced by using the rotary blades 21. The positions and the number of the cutout portions 21b in these rotary blades 21 are the same as those shown in FIG. 3. That is, a rotary blade 21 having a pair of cutouts 21b at positions opposed to each other in the radial direction across the central axis O is used. The rotary blades 21 are point-symmetric shape about the central axis O. Therefore, n1=n2 and b1=b2 is satisfied. Further, n1:b1=n2:b2=N:B is satisfied. The ratio between n1 and b1 (that is, the ratio between the connecting portion length N and the cutting portion length B) is varied in the range of 3:1 to 1:25.

In one or more embodiments, colored optical fiber cores of φ250 μm are used as the optical fibers 1, and after 12 optical fibers are collectively coated, the coating material 2 is partially cut by the above-described plurality types of rotary blades 21 to form the connecting portion 2a.

Figure 4:
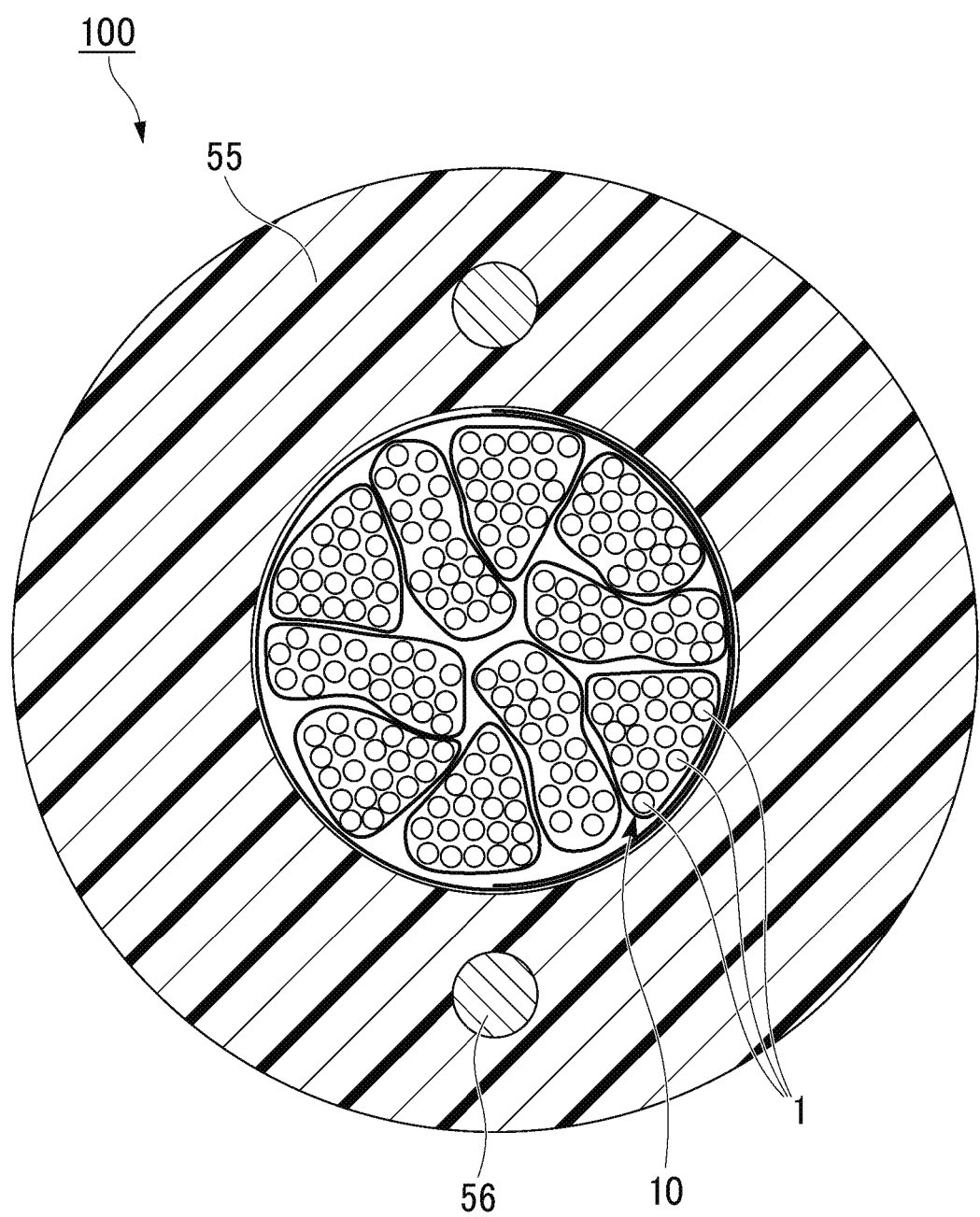
FIG. 4 is an explanatory diagram of an optical fiber cable using the intermittently-fixed optical fiber ribbon in accordance with one or more embodiments.

Further, using the intermittently-fixed optical fiber ribbons 10 of Example 3 and the single-core colored optical fiber element wire (Comparative Example 3), a 144-core optical fiber cable 100 as shown in FIG. 4 is produced in accordance with one or more embodiments. The optical fiber cable 100 includes a sheath 55 made of polyethylene, a pair of tension members 56 buried in the sheath 55, twelve intermittently-fixed optical fiber ribbons 10 (Example 3) or 144 single-core colored optical fiber element wire (Comparative Example 3) accommodated in the sheath 55.

With respect to the optical fiber cable 100 using the intermittently-fixed optical fiber ribbon 10 of Example 3 and the optical fiber cable 100 using the single-core colored optical fiber element wire of Comparative Example 3, the transmission loss of light is measured using OTDR and the difference Δα of the maximum transmission loss of light is calculated.

In the following Table 3, it is assumed that the evaluation result is OK (good) as being good when Δα≤0.05 (dB/km), and the evaluation result is NG (defective) as being insufficient when Δα≥0.05 (dB/km).

TABLE 3

| | | Connecting Portion Length N:Cutout Portion Length B | | | | | | | | | |
|---|---|---|---|---|---|---|---|---|---|---|---|
| | | 3:1 | 2:1 | 1:1 | 1:2 | 1:3 | 1:5 | 1:7 | 1:10 | 1:15 | 1:20 | 1:25 |
| Maximum Transmission Loss (dB/km) | Δα (dB/km) | 0.1 | 0.08 | 0.04 | 0.04 | 0.03 | 0.04 | 0.02 | 0.03 | 0.01 | 0.03 | 0.01 |
| | Determination | NG | NG | OK | OK | OK | OK | OK | OK | OK | OK | OK |
| Fusion Splicing Property | | OK | OK | OK | OK | OK | OK | OK | OK | OK | OK | NG |

As shown in Table 3, when the connecting portion length N is twice or more the cutout portion length B, the evaluation result of the maximum transmission loss of light is NG (defective). This is thought to be because when the connecting portion length N is relatively large, the connecting portion 2a becomes longer in the longitudinal direction X, and the optical fibers 1 on the intermittently-fixed optical fiber ribbon 10 are less likely to move relative to each other. That is, the optical fibers 1 are installed in the optical fiber cable 100 in high density, in a state where the optical fibers 1 hardly move relative to each other, and as a result, micro-bending occurs in the optical fiber 1 or local side pressure acts, so it is considered that the transmission loss of light increases.

On the other hand, as shown in Table 3, when the cutout portion length B is equal to or larger than the connecting portion length N, that is, B≥N, the evaluation result of the maximum transmission loss of light is OK (good). This is thought to be because the proportion of the blade body portion 21c cutting the coating material 2 occupied in the rotary blade 21 is larger than that of the cutout portion 21b, so the connecting portion 2a formed is shortened in the longitudinal direction X. That is, since the connecting portion 2a is short, the optical fibers 1 are easily moved relative to each other, and even if the optical fibers 1 are installed at a high density in the optical fiber cable 100, the optical fibers 1 are likely to enter the empty space in the sheath 55. Thus, the generation of micro-bending in the optical fiber 1 or the action of local side pressure is suppressed, and as a result, it could be considered that the increase in the transmission loss of light could be suppressed.

Further, in Example 3, in addition to the above consideration, the workability in fusion splicing (hereinafter referred to as fusion splicing property) of the intermittently-fixed optical fiber ribbon 10 is also checked. As shown in Table 3, when N:B is 1:25, the evaluation result of the fusion splicing property is NG (defective). This is because the cutout portion length B is excessively large, so the connecting portion 2a is excessively short in the longitudinal direction X, resulting in poor integration of the optical fibers 1.

On the other hand, in the case of B≤20N, it is possible to prevent the fusion splicing property from deteriorating as a result of securing the length of the connecting portion 2a in the longitudinal direction X.

From the above, by setting N≤B≤20N, the length of the connecting portion 2a in the longitudinal direction X falls within a range that makes it possible to secure the fusion splicing property while suppressing an increase in the transmission loss of light.

In the above consideration in Example 3, similar results are obtained even when the number of cutout portions 21b in the rotary blade 21 is changed. Specifically, the same results as described above are obtained even if the rotary blade 21 provided with one, four, five, and eight cutout portions 21b are used.

It should be noted that the technical scope of the present invention is not limited to the above-described embodiments or examples, and various modifications can be made without departing from the spirit of the present invention.

For example, the shape of the illustrated rotary blade 21 is an example and may be changed as appropriate.

The number of the optical fibers 1 included in the intermittently-fixed optical fiber ribbon 10 is not limited to the example shown and may be changed as appropriate. Further, as the optical fibers 1 included in the intermittently-fixed optical fiber ribbon 10 are changed, the number of the rotary blades 21 arranged in the width direction Y may be appropriately changed.

In FIGS. 1 and 2, since the rotary blades 21 are disposed all the spaces between the adjacent optical fibers 1, the number (for example, three) of the rotary blades 21 is the less than the number of optical fibers 1 (for example, four) by one. However, the present invention is not limited to this, and the rotary blade 21 may not be disposed between some of the optical fibers 1. For example, a plurality of optical fibers 1 arranged in the width direction Y may be an optical fiber set, and the rotary blade 21 may be disposed between the optical fiber sets. In this case, the number of rotary blades 21 may be one less than the number of optical fiber groups. In addition, one optical fiber group may include two optical fibers 1.

Besides, without departing from the spirit of the present invention, it is possible to appropriately replace the constituent elements in the above-described embodiments with well-known constituent elements, and the above-described embodiments and modifications may be appropriately combined. Accordingly, the scope of the invention should be limited only by the attached claims.

REFERENCE SIGNS LIST

1 OPTICAL FIBER
2 COATING MATERIAL
2a CONNECTING PORTION
10 INTERMITTENTLY-FIXED OPTICAL FIBER RIBBON
21 ROTARY BLADE
21a OUTER PERIPHERAL EDGE
21b CUTOUT PORTION
B CUTOUT PORTION LENGTH
N CONNECTING PORTION LENGTH
V1 VELOCITY
V2 PERIPHERAL VELOCITY

What is claimed is:

1. A method for manufacturing an intermittently-fixed optical fiber ribbon, the method comprising:
   collectively coating a plurality of optical fibers with a coating material by applying an uncured coating material that intrudes between the plurality of optical fibers and curing the intruded uncured coating material; and
   cutting the coating material positioned between the plurality of optical fibers at a predetermined interval in a longitudinal direction of the optical fibers, with a plurality of rotary blades disposed side by side in a width direction orthogonal to the longitudinal direction, while delivering the collectively-coated optical fibers at a velocity V1 in the longitudinal direction, wherein
   the velocity V1 is greater than a peripheral velocity V2 of the plurality of rotary blades.

2. The method for manufacturing an intermittently-fixed optical fiber ribbon according to claim 1, wherein
   the velocity V1 is at least twice the peripheral velocity V2.

3. The method for manufacturing an intermittently-fixed optical fiber ribbon according to claim 1, wherein
   each of the plurality of rotary blades is formed in a disc shape and has cutout portions recessed radially inward from outer peripheral edges, and
   each of the plurality of rotary blades satisfies Equation 1:

$$B \geq N. \quad (1)$$

where B is a sum of arc lengths of the outer peripheral edges and N is a sum of virtual arc lengths of the outer peripheral edges in the cutout portion.

4. The method for manufacturing an intermittently-fixed optical fiber ribbon according to claim 3, wherein
   each of the plurality of rotary blades further satisfies Equation 2:

$$B \leq 20N. \quad (2).$$

5. The method for manufacturing an intermittently-fixed optical fiber ribbon according to claim 1, wherein
   when viewed in the width direction, the outer peripheral edges of at least two adjacent rotary blades among the plurality of rotary blades partially overlap.

6. The method for manufacturing an intermittently-fixed optical fiber ribbon according to claim 1, wherein
   when viewed in the width direction, cutout portions of at least two adjacent rotary blades among the plurality of rotary blades do not overlap.

* * * * *